(No Model.)
H. ETHERIDGE.
BALANCED PEN FOR AUTOGRAPHIC TELEGRAPHS.
No. 425,413. Patented Apr. 15, 1890.
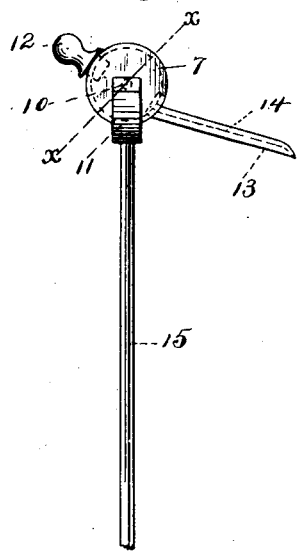
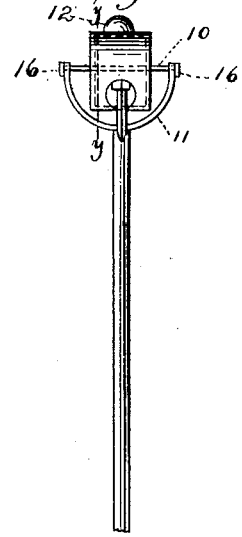
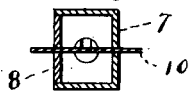
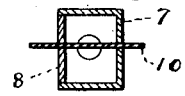
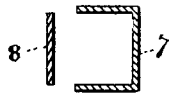
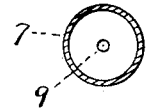
Witnesses:
W. E. Bowen
J. E. M. Bowen
Inventor
Harry Etheridge
by Wm. C. Behrend
Atty.

UNITED STATES PATENT OFFICE.

HARRY ETHERIDGE, OF PITTSBURG, PENNSYLVANIA, ASSIGNOR TO THE WRITING TELEGRAPH COMPANY, OF NEW YORK, N. Y.

BALANCED PEN FOR AUTOGRAPHIC TELEGRAPHS.

SPECIFICATION forming part of Letters Patent No. 425,413, dated April 15, 1890.

Application filed November 14, 1888. Serial No. 290,777. (No model.)

*To all whom it may concern:*

Be it known that I, HARRY ETHERIDGE, a subject of the Queen of Great Britain and a resident of Pittsburg, in the county of Allegheny and State of Pennsylvania, have invented a certain new and useful Balanced Pen for Autographic Telegraphs, of which the following is a specification.

This invention relates to fountain-pens adapted for use in connection with the stylus of the transmitting-instrument and with the receiving-rod of the receiving-instrument of autographic and analogous telegraphs.

The invention has for its object to produce a fountain-pen for the purpose in question which will always maintain an accurately-balanced condition, so that there will be at all times a minimum and uniform amount of friction between the nib of the pen and the surface written upon and not a variable frictional contact.

In the accompanying drawings, forming a part of this specification, and in which like features are indicated by like figures of reference in the several views, Figure 1 is a side elevation of a fountain-pen embodying my invention, shown mounted upon the armature-rod of a automatic telegraph. Fig. 2 is a front elevation of Fig. 1. Figs. 3 and 4 are cross-sections through the reservoir on the line x x of Fig. 1, the former looking toward the nib of the pen and the latter toward the counterpoise 12. Fig. 5 is likewise a cross-section on the line x x of Fig. 1, showing the disk 8 removed; and Fig. 6 is a cross-section on the line y y of Fig. 2.

In the drawings, 7 indicates the reservoir for the ink. This reservoir is preferably cylindrical in cross-section, as shown in Fig. 6; and as the drawings are made on a full-sized scale its length is plainly shown in Fig. 2. Dimensions, however, do not enter into the invention.

The reservoir 7 may be made of ebonite or of any material suitable for the purpose, and one of its disks or ends 8 is made separate from the body and adapted to be secured fluid-tight in place after the interior of the reservoir has been properly finished. The ends of the reservoir are centerally perforated, as at 9, to receive the axle 10, preferably of German silver wire, which axle serves as a supporting means and is firmly secured fluid-tight to the reservoir, and has its bearings in the socket 11, as shown, in order that the necessary swinging axial motion may be imparted to the pen during the operation of writing. It is of course not essential that the axle 10 should extend clean through the reservoir, as it may be divided and suitably secured to the outside of the reservoir in any well-known manner. Nor is it necessary that the supporting means for the reservoir should be located precisely as shown, provided it be centrally arranged in such manner as to secure an equal distribution of the contained fluid on each side of the same.

In the rounding surface of reservoir 7, preferably equidistant between its ends 8, there is placed a counterpoise 12, which may or may not enter the reservoir, and instead of comprising a distinct element said counterpoise may be formed integral with the reservoir. Preferably opposite the counterpoise 12 is an opening to receive nib 13. This nib is also made of ebonite or of other suitable material and of substantially the shape shown. It is provided with a narrow duct 14, open at the top, for conveying the ink by capillary attraction from the reservoir to the paper. This duct is of such proportions as to permit just the desired quantity of ink to pass to the paper as the pen moves over the latter in defining the movements of the armature-rod 15. To the sides of the socket 11 there may be soldered pieces of metal 16 to prevent lateral movement of the pen.

Whenever in this specification the word "centrally" is used in referring to the location of the supporting means for the fountain-pen and its contained reservoir it is to be understood as meaning centrally with reference to securing and maintaining an equal distribution of the contained fluid on each side of the supporting means.

It is plain from the foregoing that as the ink is filled into the reservoir 7 it distributes itself equally on both sides of the axle, passing longitudinally through the center of the same, and hence no addition or subtraction of weight by the filling in or consumption of ink will operate in any degree to disturb the accurate balanced condition of the pen. The same result will obviously be obtained if the supporting means be located otherwise than as shown, provided it be centrally located with reference to maintaining at all times the same weight of fluid on both sides of said supporting means.

Having thus described my invention, what I claim as new, and desire to secure by Letters Patent, is—

The combination, with the receiving armature-rod of an autographic telegraph, of a fountain-pen provided with a reservoir, said pen pivoted centrally with reference to said reservoir to said armature-rod and having its writing-point end slightly heavier than the other, whereby said pen will rest on the paper with the same slight pressure whether the reservoir is empty or filled, substantially as described.

Signed at New York, in the county of New York and State of New York, this 21st day of September, A. D. 1888.

HARRY ETHERIDGE.

Witnesses:
J. E. M. BOWEN,
J. J. KENNEDY.